United States Patent
Razzaghe-Ashrafi et al.

(10) Patent No.: US 6,202,169 B1
(45) Date of Patent: Mar. 13, 2001

(54) TRANSITIONING BETWEEN REDUNDANT COMPUTER SYSTEMS ON A NETWORK

(75) Inventors: Siamak Razzaghe-Ashrafi; Denny D. Landaveri, both of Santa Clara, CA (US)

(73) Assignee: Nortel Networks Corporation, Montreal (CA)

(*) Notice: Subject to any disclaimer, the term of this patent is extended or adjusted under 35 U.S.C. 154(b) by 0 days.

(21) Appl. No.: 09/001,544

(22) Filed: Dec. 31, 1997

(51) Int. Cl.$^7$ .......................... H02H 3/05; H03K 19/003
(52) U.S. Cl. ........................................ 714/6; 714/1
(58) Field of Search ........................... 709/203, 221, 709/220, 245, 300, 304, 223, 228, 243; 714/4, 10, 11, 6

(56) References Cited

U.S. PATENT DOCUMENTS

| | | | |
|---|---|---|---|
| 5,696,895 | * | 12/1997 | Hemphill et al. ............... 395/182.02 |
| 5,790,541 | * | 8/1998 | Patrick et al. ....................... 370/392 |
| 5,812,751 | * | 9/1998 | Ekrot et al. ........................... 395/182 |
| 5,917,997 | * | 6/1999 | Bell et al. ........................ 395/182.02 |
| 5,923,840 | * | 7/1999 | Desnoyers et al. .................. 395/185 |
| 5,936,936 | * | 8/1999 | Alexander, Jr. et al. ............ 370/216 |

OTHER PUBLICATIONS

HolonTech Corporation, "The HyperFlow Architecture for all/IP Web Server Clustering", Feb., 1998, 12 pages.

David C. Plummer, "An Ethernet Address Resolution Protocol" or "Converting Network Protocol Addresses to 48.bit Ethernet Address for Transmission on Ethernet Hardware", Nov., 1982, 10 pages.

Schuba et al., "Classical IP and ARP over ATM", 24 pages.

* cited by examiner

Primary Examiner—Thomas C. Lee
Assistant Examiner—Nitin Patel
(74) Attorney, Agent, or Firm—Blakely, Sokoloff, Taylor & Zafman LLP

(57) ABSTRACT

A method is provided for transitioning between redundant computer systems on a network. According to one aspect of the present invention, fault tolerance may be achieved in a network which includes one or more redundant computer systems by monitoring the status of a primary system and having a redundant system take over for the primary system upon determining the primary system has entered a predetermined state (e.g., lost power, CPU has gone down, etc.). Each host machine on the network includes an address translation table (e.g., an Address Resolution Protocol (ARP) cache) for purposes of dynamically mapping a logical address (e.g., an Internet Protocol (IP) address) to a physical address (e.g., a MAC address). Therefore, transitioning from the primary system to a redundant system that shares the same logical address may be accomplished by simply transmitting an ARP reply containing therein the shared logical address and the physical address of the redundant system or an ARP proxy server with which the redundant system is registered. In this manner, the host machines will update their address translation tables such that the shared logical address will be associated with the physical address provided in the ARP reply and further transmissions addressed to the shared logical address will in effect be redirected to the redundant system either directly or indirectly through the ARP proxy server.

17 Claims, 6 Drawing Sheets

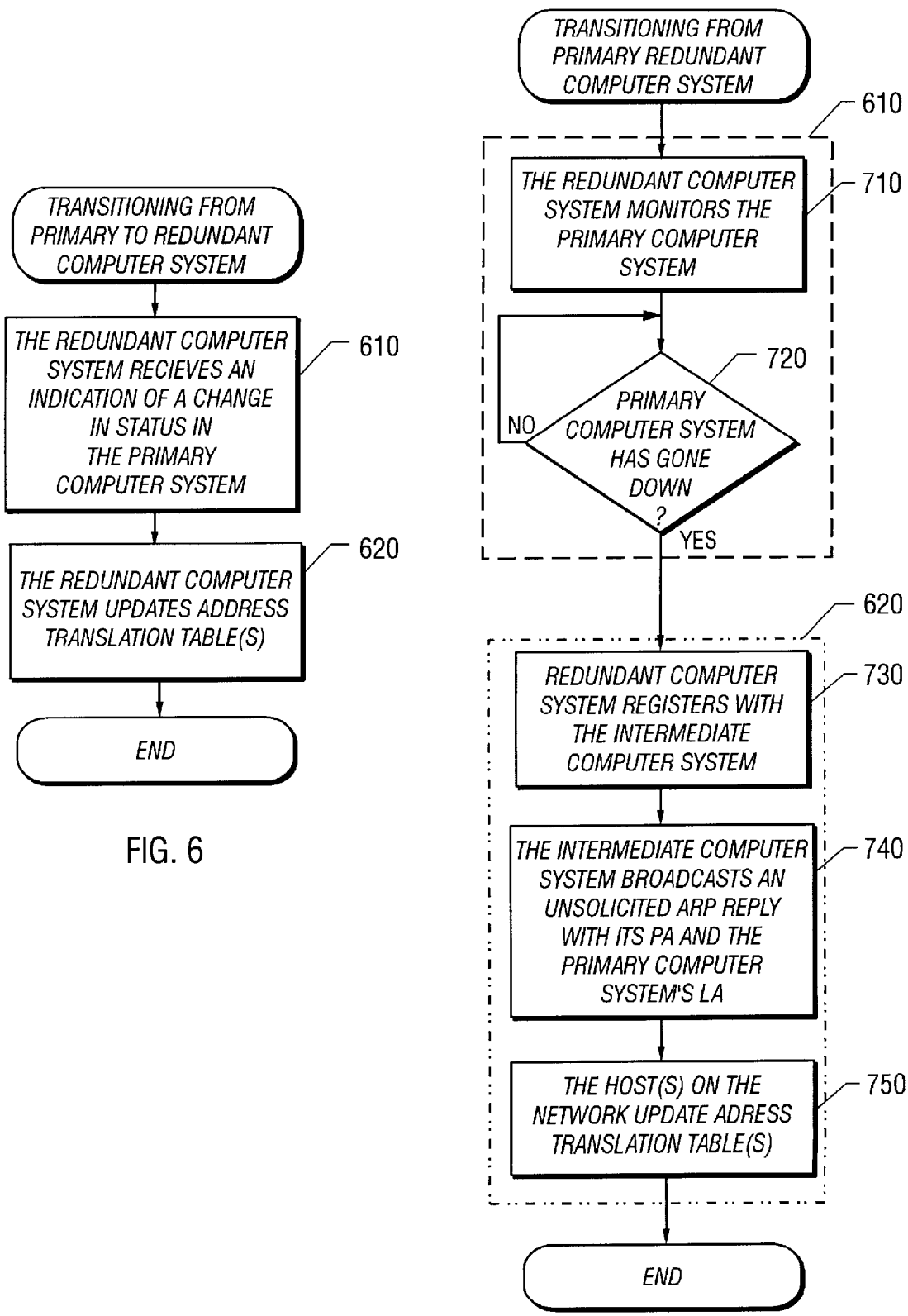

TRANSITIONING BETWEEN REDUNDANT COMPUTER SYSTEMS ON A NETWORK

FIELD OF THE INVENTION

The invention relates generally to the field of computer networking. More particularly, the invention relates to a mechanism for allowing a redundant computer system to take over for a primary computer system upon the happening of a predetermined event.

BACKGROUND OF THE INVENTION

Often in a networking environment it is advantageous to have redundant resources. For example, redundancy may be used to increase the fault tolerance of a network. One of the difficulties of taking advantage of redundant computer systems, however, lies in transitioning from one computer system to the other with minimal disruption on the software applications that may be using resources associated with the primary computer system. For instance, upon such a transition, to assure network traffic destined for a primary computer system is, instead, sent to a redundant computer system, one approach would be to move the addresses associated with the primary computer system to the redundant computer system. This involves moving the primary computer system's logical address (e.g., an Internet Protocol (IP) address) and the hardware or physical address (e.g., an Ethernet address) embedded in the primary computer system's communication device to the redundant computer system. However, since hardware addresses are typically assigned and burned into communication devices by the manufacturer, they are usually thought of as fixed. Therefore, an approach that requires a hardware address to be moved from one communication device to another is quite unnatural.

In addition, third-party software applications, provided by Microsoft and other software vendors, would require modification to handle this redundancy scheme. Applications would have to be altered to react appropriately during a transition from one computer system to another. For example, upon detecting such a transition, the applications might need to be configured to store their current state, terminate existing connections with the primary computer system, re-establish the appropriate connections with the redundant computer system, and then resume processing with the redundant computer system at the stored state. It should be appreciated that an approach to network redundancy involving rewriting third-party software applications is neither desirable nor directly available to designers and manufacturers of networking equipment, as such an approach would likely require the consent and cooperation of many different software vendors.

In view of the foregoing, what is needed is an elegant mechanism for transitioning between redundant computer systems. Specifically, it would be advantageous to perform the transition without having to perform the awkward step of moving a hardware address from one communication device to another. Ideally, the transition should also be transparent to software applications that may have been communicating with the primary computer system prior to the transition.

SUMMARY OF THE INVENTION

A method is described for transitioning between redundant computer systems on a network. The redundant computer system receives an indication of a change in status of a primary computer system. In response to the change in status, the redundant computer system causes an entry in an address translation table on a third computer system to be updated. By employing this simple, elegant mechanism for transitioning between redundant computer systems hardware addresses need not be moved from one communication device to another and the transition is transparent to software applications that are communicating with the primary computer system during the transition.

According to one aspect of the present invention, prior to being updated the entry maps a first logical address associated with the primary computer system to a first physical address and after the update then entry maps the first logical address to a second physical address.

According to another aspect of the present invention, the redundant computer system causes the entry in the address translation table to be updated by causing an unsolicited Address Resolution Protocol (ARP) reply to be transmitted to the third computer system.

According to yet another aspect of the present invention, the redundant computer system is coupled to the network through a first ARP proxy server and the primary computer system is coupled to the network through a second ARP proxy server.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a flow diagram illustrating the processing involved in transitioning from a primary computer system to a redundant computer system according to one embodiment of the present invention.

FIG. 7 is a flow diagram illustrating the processing involved in transitioning from a primary computer system to a redundant computer system according to another embodiment of the present invention.

DETAILED DESCRIPTION

Figure 1A:
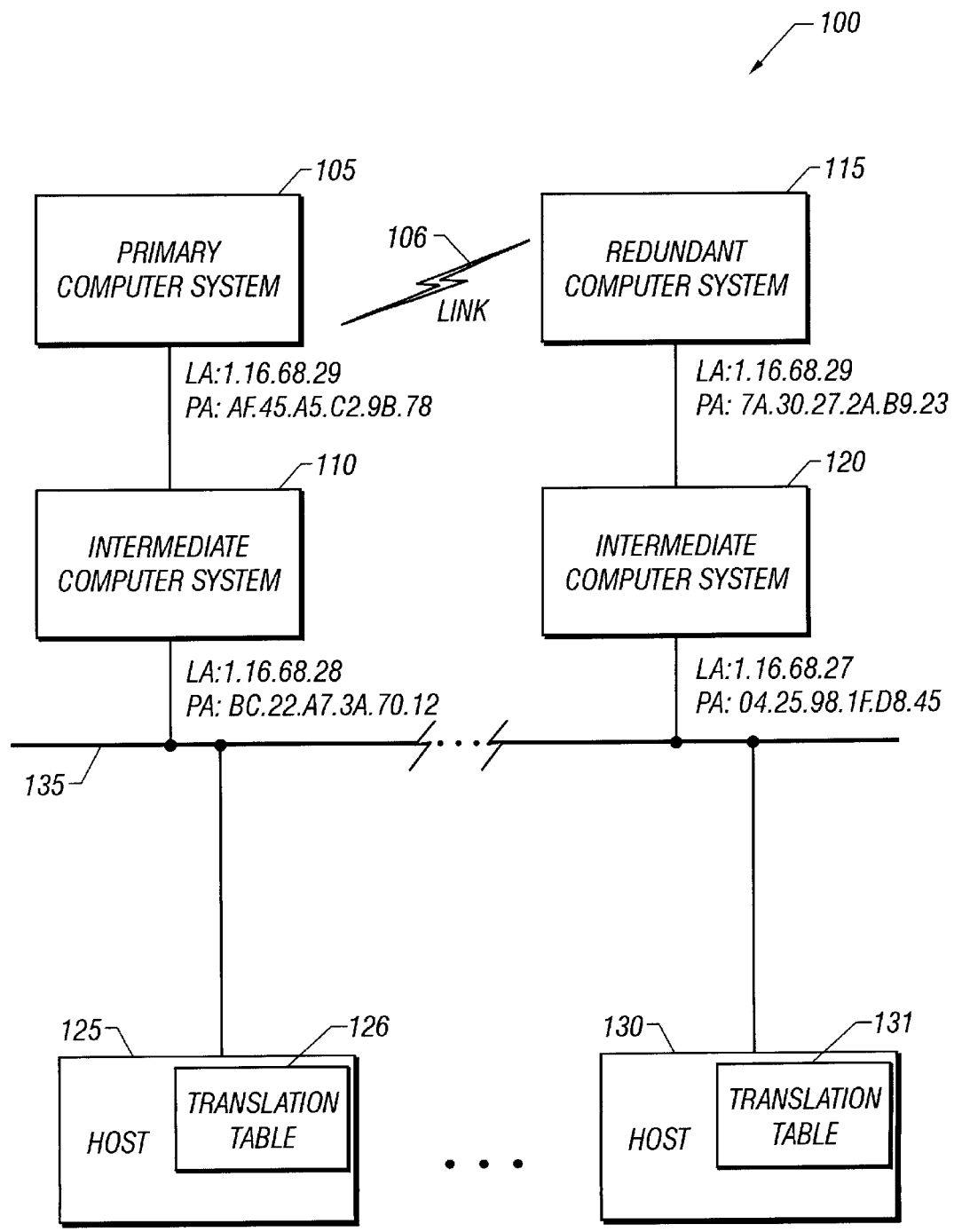
FIG. 1A is a block diagram illustrating a network with redundant computer systems in which one embodiment of the present invention may be employed.

A method of transitioning between redundant computer systems is described. According to various embodiments of the present invention, fault tolerance may be achieved in a network which includes one or more redundant computer systems by monitoring the status of a primary computer system and having a redundant computer system take over for the primary computer system upon determining the primary computer system has gone down. Each host machine on the network includes an address translation table for purposes of mapping a logical address to a physical address. Therefore, an elegant transition from a primary computer system to a redundant computer system that shares the same logical address may be accomplished by simply updating the address translation tables. After having received a physical address in response to an address resolution request corresponding to the logical address of the primary computer system, the address translation tables associate the primary computer's logical address with the primary computer's physical address or the physical address of an associated proxy server. After the address translation tables are updated for purposes of transitioning from the primary computer to the redundant computer, however; the logical address becomes associated with the physical address of the redundant computer system or the physical address of a proxy server with which the redundant computer system is registered. Importantly, the address translation tables are accessed by protocol layers located below the application layer in the protocol stack. As a result, applications running on the host machines are not disturbed by changes to these tables. Advantageously, in this manner, a seamless transition may be made from one computer system to another without the trouble of modifying the standard applications that run on the host machines.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be embodied in machine-executable instructions. The instructions can be used to cause a general-purpose or special-purpose processor that is programmed with the instructions to perform the steps of the present invention. Alternatively, the steps of the present invention may be performed by specific hardware components that contain hardwired logic for performing the steps, or by any combination of programmed computer components and custom hardware components. While, embodiments of the present invention will be described with reference to an Ethernet network and a specific address resolution protocol, the method described herein is equally applicable to other types of networks and address resolution schemes.

ADDRESS RESOLUTION

As this disclosure is written for those of ordinary skill in the art, familiarity with address resolution schemes such as the Address Resolution Protocol (ARP) is assumed. For a detailed discussion of ARP see Request For Comments (RFC) 826 entitled "An Ethernet Address Resolution Protocol" by David C. Plummer, November 1982, which describes a protocol that allows dynamic distribution of information needed to convert Protocol Addresses (e.g., logical addresses or Internet Protocol (IP) addresses) to Local Network Addresses (e.g., physical addresses or Ethernet addresses).

EXEMPLARY REDUNDANT NETWORKS

Referring now to FIG. 1A, an exemplary network 100 with redundant computer systems 105, 110, 115, and 120 is briefly described in which one embodiment of the present invention may be employed. In the embodiment depicted, the network 100 includes primary computer system 105, redundant computer system 115, and optional intermediate computer systems 110, 120. The network 100 may be a simple Local Area Network (LAN), a company's Intranet comprising many interconnected LANs, or the network 100 may represent the Internet. Due in part to the optional nature of the intermediate computer systems 110, 120, it should be appreciated that in alternative embodiments, more or less computer systems may be part of the network 100.

In any event, the primary computer system 105 may be coupled to communication medium 135 directly or optionally it may be coupled to the communication medium 135 via intermediate computer system 110. The intermediate computer system 110 may act as an Address Resolution Protocol (ARP) proxy server for the primary computer system 105 by responding to ARP requests for the physical address of the primary computer system 105 with ARP replies containing the physical address of the intermediate computer system 110. When the optional intermediate computer system 110 is present it routes messages (e.g., EP packets) addressed to the primary computer system's logical address to the primary computer system 105.

The redundant computer system 115 may also be directly coupled to the communication medium 135 or coupled indirectly through optional intermediate computer system 120. In the latter case, the intermediate computer system 120 may proxy ARP for the redundant computer system 115. That is, the intermediate computer system 120 may respond on behalf of the redundant computer system 115 to ARP requests for the redundant computer system's physical address. When the optional intermediate computer system 120 is present it routes messages (e.g., IP packets) addressed to the redundant computer system's logical address to the primary computer system 105.

A link 106 may optionally allow the primary computer system 105 and the redundant computer system 115 to communicate directly. The link 106 may be a physical link, such as a CMB cable, a wireless link, or other communication medium. In any event, the link 106 may be used by the redundant computer system 115 to monitor the status of the primary computer system 105.

Additionally, link 106 may be used to allow the redundant computer system 115 to "mirror" the primary computer system 105 as will be discussed further below. In this manner, the redundant computer system 115 would be able to take over for the primary computer system 105 should the primary computer system 105 experience a failure (e.g., crash, loss of power, etc.).

The network 100 also includes host machines 125, 130. Applications running on the host machines 125, 130 may depend upon various resources and/or services provided by primary computer system 105. Host machine 125 and host machine 130 each further include an address translation table (also referred to as an "ARP cache") 126 and 131, respectively. The address translation tables 126, 131 maintain mappings between logical addresses (e.g., IP addresses) and their corresponding physical addresses (e.g., Media Access Control (MAC) addresses).

Figure 1B:
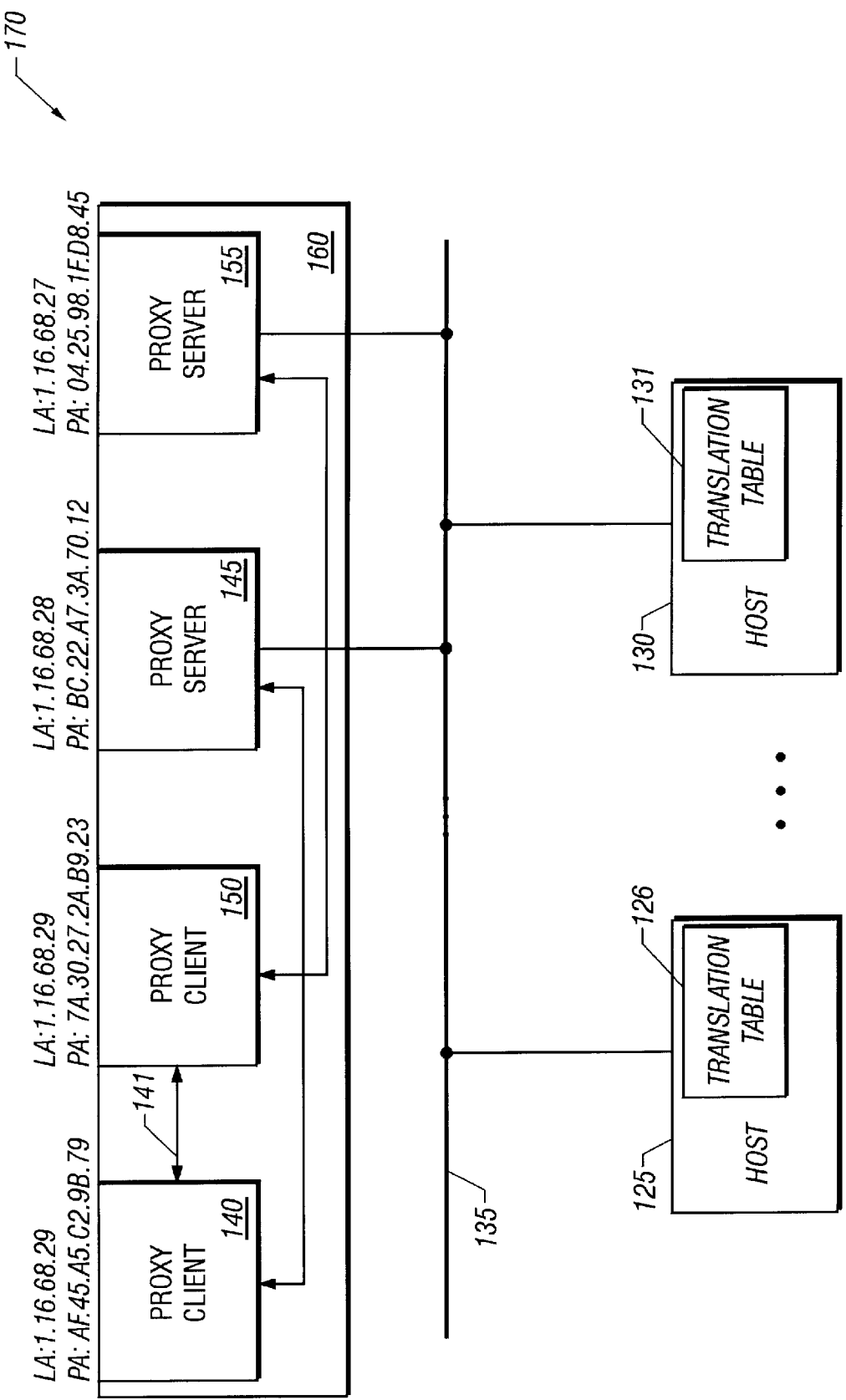
FIG. 1B is a block diagram illustrating network redundancy according to another embodiment of the present invention.

FIG. 1B is a block diagram illustrating network redundancy according to another embodiment of the present invention. In this embodiment, a network 170 comprises host machines 125, 130, described above, and a redundant, chassis-based system 160 coupled to communication medium 135. The chassis 160 includes four cards, in this example, two proxy client cards 140, 150 and two proxy server cards 145, 155. In one embodiment, proxy server 155 may act as an ARP proxy server for proxy client 150 and proxy server 145 may act as an ARP proxy server for proxy client 140. As above, a link 141 may provide the redundant client 140 or 150 with the ability to monitor and mirror the primary client 140 or 150.

ADDRESS TRANSLATION TABLE MODIFICATION

When one of the redundant computer systems undergoes a change in status, such as a failure, a crash, a loss of power, or the like, it is desirable for network traffic destined for the computer system that has gone down to be redirected to another computer system in a manner that is transparent to the software applications that may be generating the network traffic.

Disregarding conventional wisdom which suggests address resolution replies should be sent only by the target computer system and only in response to an address resolution query, the assignee of the present invention has discovered that existing address resolution schemes, such as ARP or the like, may be employed to redirect network traffic from one computer to another in a manner that is transparent to software applications that may be communicating with the computer at the time of transition. Rather that transmitting an address resolution reply (e.g., an ARP reply) from the target system in response to an address resolution query (e.g., an ARP query), according to embodiments of the present invention, a system other than the target system may generate and broadcast an unsolicited address resolution reply to all hosts on the network upon detecting the target system has undergone a predetermined change in status. Importantly, because the logical address of the redundant computer systems is the same, all that needs to be changed is the physical address currently bound to the logical address. This binding is changed by way of an unsolicited address resolution reply which instructs devices on the network to replace the current physical address associated with the logical address of the failed computer system with the physical address of the redundant computer system or a proxy server associated with the redundant computer system as will be illustrated below.

Figure 2A:
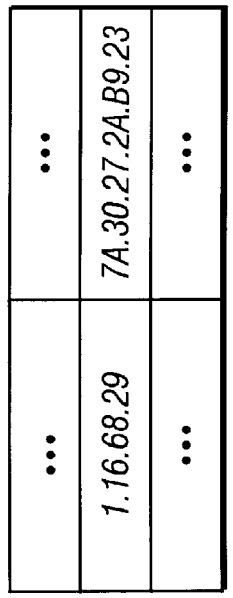
FIG. 2A illustrates an address translation table in an initial state.

FIG. 2A illustrates a simplified address translation table 126 in an initial state after the host 125 has learned the physical address of the primary computer system 105, for example.

Figure 2B:
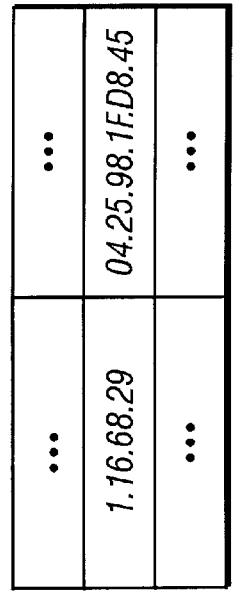
FIG. 2B illustrates the address translation table of FIG. 2A after it has been updated according to one embodiment of the present invention.

Assuming the status of the primary computer system 105 has changed and the change in status was detected by the redundant computer system 115, FIG. 2B illustrates the address translation table 126 of FIG. 2A after the address translation table 126 has been updated to contain the physical address of the redundant computer system 115. For example, the update may have been caused by host 125 receiving an unsolicited address resolution reply from the redundant computer system 115 containing the physical address of the redundant computer system 115. In this manner, subsequent attempts by host 125 to send a message (e.g., an IP packet) to the primary computer system 105 will result instead in a message being transmitted to the physical address of the redundant computer system 115 without the application software running on the host 125 realizing the difference or being impacted by the transition.

Figure 3A:
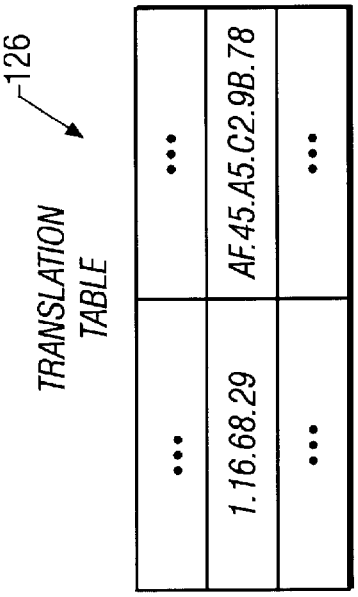
FIG. 3A illustrates an address translation table in an initial state.

FIG. 3A illustrates a simplified address translation table 126 in an initial state after the host 125 has learned that the physical address to be bound to the primary computer system's logical address is the physical address of the intermediate computer system 110 (e.g., an ARP proxy server, router, or the like), for example.

Figure 3B:
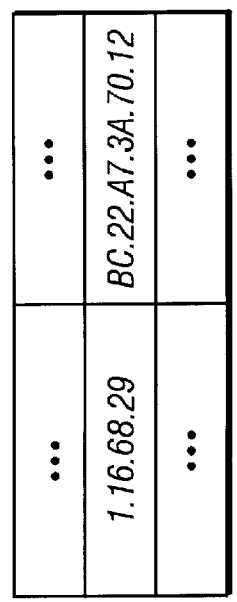
FIG. 3B illustrates the address translation table of FIG. 3A after it has been updated according to one embodiment of the present invention.

Assuming the status of the primary computer system 105 has changed and the change in status was detected by the redundant computer system 115, FIG. 3B illustrates the address translation table 126 of FIG. 3A after the address translation table 126 has been updated to contain the physical address of the intermediate computer system 120 (e.g., an ARP proxy server, router, or the like). According to one embodiment of the present invention, the update to this particular entry in the address translation table 126 of host 125 may be caused by the host 125 receiving an unsolicited address resolution reply from the intermediate computer system 120 containing the physical address of the intermediate computer system 120 and the shared logical address. In this manner, subsequent attempts by host 125 to send a message (e.g., an IP packet) to the primary computer system 105 will result instead in a message being transmitted to the physical address of the intermediate computer system 120 which will in turn forward the message to the redundant computer system 115. Again, this transition from the primary computer system 105 to the redundant computer system 115 is accomplished without the application software running on the host 125 realizing the difference, being impacted by the transition, and without the software being rewritten.

AN EXEMPLARY COMPUTER SYSTEM

Figure 4:
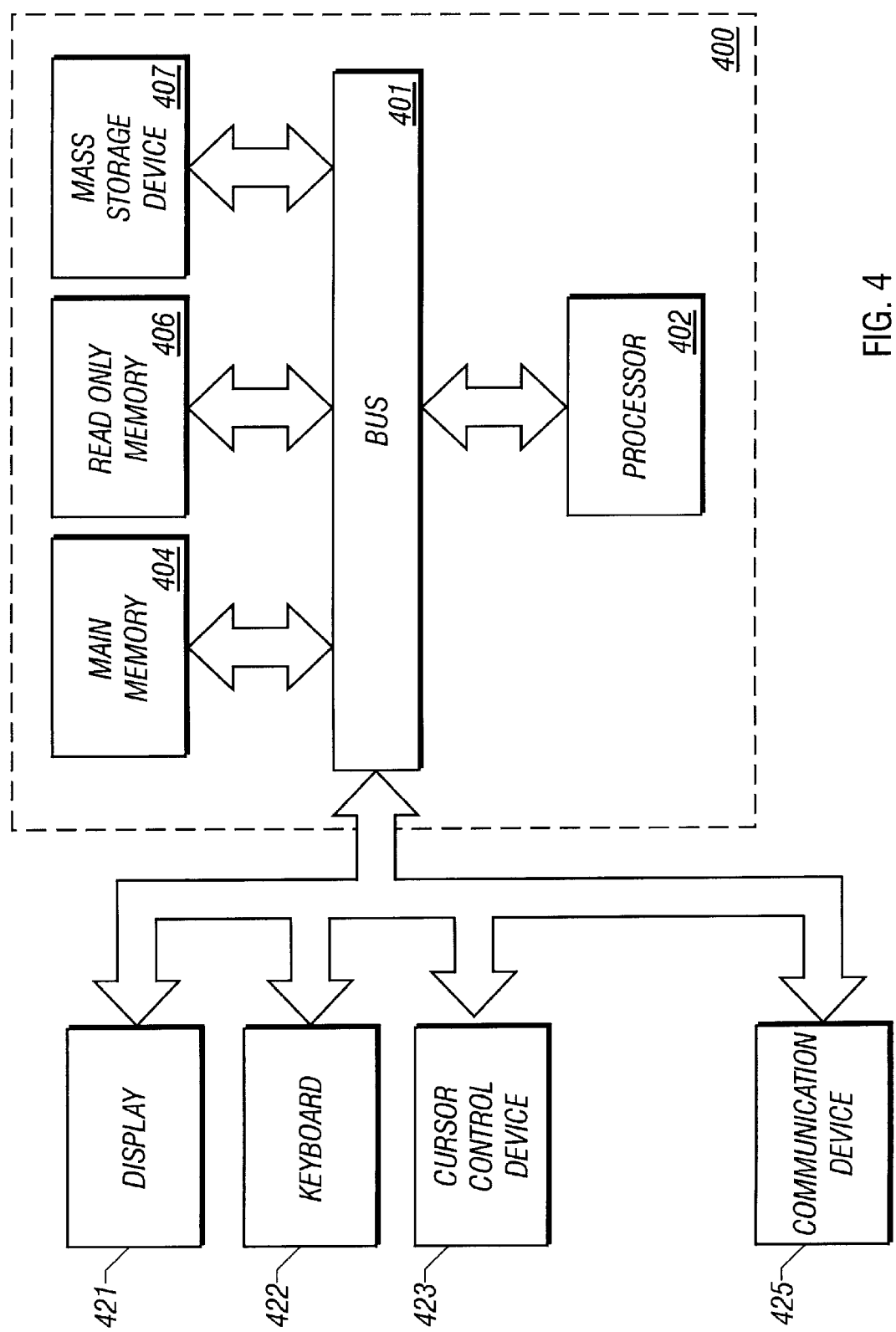
FIG. 4 is an example of a typical computer system upon which one embodiment of the present invention may be implemented.

A computer system 400 representing an exemplary intermediate computer system 110, 120 or primary or redundant computer system 105, 115 in which features of the present invention may be implemented will now be described with reference to FIG. 4. Computer system 400 comprises a bus or other communication means 401 for communicating information, and a processing means such as processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 for storing static information and instructions for processor 402.

A data storage device 407 such as a magnetic disk or optical disc and its corresponding drive may also be coupled to computer system 400 for storing information and instructions. Computer system 400 may also be coupled via bus 401 to a display device 421, such as a cathode ray tube (CRT) or Liquid Crystal Display (LCD), for displaying information to a computer user. Typically, in the case of a host machine 125, 130, an alphanumeric input device 422, including alphanumeric and other keys, may be coupled to bus 401 for communicating information and/or command selections to processor 402. Another type of user input device is cursor control 423, such as a mouse, a trackball, or cursor direction keys for communicating direction information and command selections to processor 402 and for controlling cursor movement on display 421.

A communication device 425 may also coupled to bus 401 for communicating with other computer systems on the network 100 or accessing remote servers, such as primary computer system 105 or redundant computer system 115, or other servers via the Internet, for example. The communication device 425 may include a modem, a network interface card, or other well known interface devices, such as those used for coupling to Ethernet, token ring, ATM, or other type of network. In any event, in this manner, the computer system 400 may be coupled to a number of clients and/or servers via a conventional network infrastructure, such as a company's Intranet and/or the Internet, for example.

While for simplicity, the computer systems of FIGS. 1A and 1B have been described as general desktop machines or workstations, it should be appreciated that the redundant computer systems may be one of many private branch exchange (PBX) systems manufactured and sold by Northern Telecom, the assignee of the present invention, such as the Meridian 1 product line. Further, in various embodiments of the present invention the host machines 125, 130 may employ Meridian Administration Tools developed by the assignee of the present invention, such as MAT Release 5 which supports communication to the Meridian 1 through the use of TCP/IP over Ethernet or the use of PPP for serial connections. In this manner, users stationed at the host machines 125, 130 may receive detailed information regarding stations administration, traffic analysis, call accounting, call tracking, alarm management, etc.

NETWORK REDUNDANCY OVERVIEW

Figure 5:
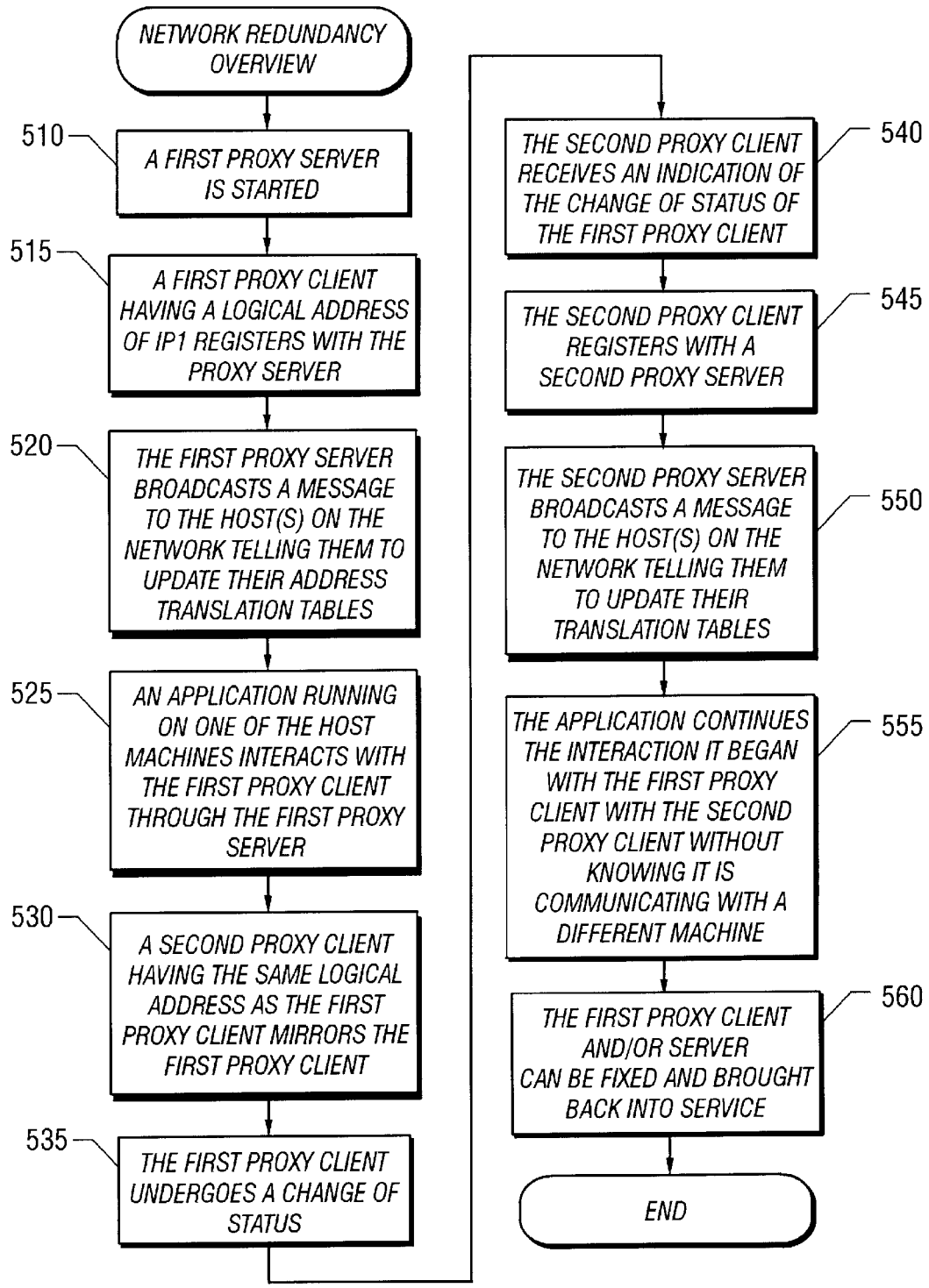
FIG. 5 is a flow diagram illustrating high level network redundancy processing according to one embodiment of the present invention.

Having described exemplary environments in which the present invention may be employed, a high level overview of the network redundancy processing according to one embodiment of the present invention will now be described with reference to FIG. 5. The steps described below may be performed under the control of a programmed processor, such as processor 402. At step 510, a first proxy server 145 (the primary system) is started. In this example, at step 515, a first proxy client 140 registers with the first proxy server 145. At step 520, the first proxy server 145 broadcasts a message (e.g., an ARP reply or the like) to the hosts 125, 130 on the network 170 telling them to update their address translation tables 126, 131 with the first proxy server's physical address (e.g., MAC address) for purposes of sending packets to the shared logical address. At step 525, an application running on one of the host machines 125, 130 interacts with the first proxy client 140 through the first proxy server 145.

In the present embodiment, at step 530, a second proxy client 150 having the same logical address as the first proxy client 140 may mirror the first proxy client 140. By mirroring what is meant is: (1) shadowing the memory of the first proxy client 140 within a memory of the second proxy client 150 while the processor of the second proxy client 150 remains idle, (2) concurrently running the same tasks, programs, etc. on both clients 140, 150, or (3) other mechanism for providing the current state of the first proxy client 140 to the second proxy client 150 so as to allow the redundant system to continue processing where the primary system left off. For example, certain values from registers in the central processing unit of the primary system may be transferred to the redundant system, such as the program counter (PC) which contains the address of the next instruction to be executed in the program sequence.

At step 535 the first proxy client 140 undergoes a change of status. For example, the power may have gone down, the processor may have crashed, or some other system fault may have occurred. Those of ordinary skill in the art will be aware of various other changes in status that may warrant transitioning to the second proxy client 150. In any event, at step 540, the second proxy client 150 receives an indication of the change of status of the first proxy client 140. The indication may be received over link 141 or from the network 175 via proxy server 155, for example.

Responsive to the change of status of the first proxy client 140, the second proxy client 150 registers with a second proxy server 155 (step 545). The second proxy server 155 then broadcasts a message (e.g., an ARP reply or the like) to the hosts 125, 130 on the network 170 telling them to update their address translation tables 126, 131 with the second proxy server's physical address for purposes of sending packets to the shared logical address (step 550). In this manner, subsequent packets sent by hosts 125, 130 will be routed to the second proxy client 150 via the second proxy server 155.

Importantly, at this point, the first proxy server 145 should no longer respond to address resolution requests for the logical address shared by the first proxy client 140 and the second proxy client 150. Once the second proxy client 150 has taken over for the first proxy client 140, only the second proxy server 155 should proxy ARP for the logical address shared by the two proxy clients 140, 150. In this manner, confusion regarding the correct physical address to be bound with the shared logical address will be avoided.

At step 555, the application continues the interaction that was begun at step 525. However, the application is now unknowingly communicating with a different system, namely the second proxy client 145 via the second proxy server 155. At this point, the first proxy client 140 and/or the first proxy server 150 may be repaired and brought back into service.

TRANSITIONING FROM A PRIMARY COMPUTER SYSTEM TO A REDUNDANT COMPUTER SYSTEM

Exemplary mechanisms for transitioning between redundant computer systems will now be described. FIG. 6 is a flow diagram illustrating the processing involved in transitioning from a primary computer system to a redundant computer system according to one embodiment of the present invention. In this embodiment, at step 610, the redundant computer system 115 receives an indication of a change in status in the primary computer system 105. Again this indication may be via the link 106 or by way of the network 100. In any event, at step 620, the redundant computer system 115 causes the address translation tables 126, 131 on the network to be updated thereby causing subsequent packets destined for the logical address shared by the two computer systems 105, 115 to be routed to the redundant computer system 115 either directly or indirectly through the intermediate computer system 120.

FIG. 7 is a flow diagram illustrating the processing involved in transitioning from a primary computer system to a redundant computer system according to another embodiment of the present invention. According to the embodiment depicted, step 610 further comprises steps 710 and 720. At step 710, the redundant computer system 115 monitors the primary computer system 105. If the primary computer system 105 has gone down at step 720 then processing proceeds to step 730; otherwise the redundant computer system 115 continues to test for a change in status of the primary computer system 105.

According to this embodiment, step 620 further comprises steps 730 though 750. At step 730 the redundant computer system 115 registers with the intermediate computer system 120. Importantly, since the redundant computer system 115 and the primary computer system 105 share the same logical address, only one should be active on the network 100 at a time.

At step 740, the intermediate computer system 120 broadcasts an unsolicited ARP reply including the physical address of the intermediate computer system 120 and the logical address shared by the primary computer system 105 and the redundant computer system 115. Responsive to receipt of the broadcast ARP reply, at step 750, each host on the network that receives the ARP reply updates its address translation table to map the shared logical address to the physical address of the intermediate computer system 120.

ALTERNATIVE EMBODIMENTS

Many alternative embodiments are contemplated by the assignee of the present invention. For example, it is envisioned that aspects of the present invention may be a valuable addition to the World Wide Web ("the Web"). By way of illustration, redundant groups of HyperText Transfer Protocol (HTTP) servers may reside behind ARP proxy servers, when one or more of the HTTP servers in one group crash, the other group may take over by causing address resolution replies to be broadcast throughout the network. In this manner, both the number of lost hits and the perceived downtime can be minimized.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
  a redundant computer system receiving an indication of a change in status of a primary computer system, the redundant computer system coupled to the network through a first intermediate computer system which acts as an ARP proxy server for the redundant computer system; and
  responsive to the change in status, the redundant computer system updating an entry in an address translation table on a third computer system by causing the first intermediate computer system to transmit an unsolicited ARP reply to the third computer, wherein prior to being updated the entry mapping a first logical address associated with the primary computer system to a first physical address, after being updated the entry mapping the first logical address to a second physical address.

2. The method of claim 1, wherein the primary computer system is coupled to the network through a second intermediate computer system which acts as an ARP proxy server for the primary computer system, and wherein the first physical address is associated with the second intermediate computer system and the second physical address is associated with the first intermediate computer system.

3. The method of claim 2, wherein the first and second physical addresses comprise Ethernet addresses.

4. The method of claim 1, wherein the unsolicited ARP reply indicates the first logical address maps to the second physical address.

5. The method of claim 4, wherein the first and second logical addresses comprise the same IP addresses.

6. A method comprising:
  providing a first and a second proxy client having a shared Internet Protocol (IP) address;
  providing a first proxy server corresponding to the first proxy client, the first proxy server having a first physical address associated therewith;
  providing a second proxy server corresponding to the second proxy client, the second proxy server having a second physical address associated therewith;
  the first proxy client registering as a client of the first proxy server;
  the first proxy server broadcasting onto the network an unsolicited Address Resolution Protocol (ARP) reply, in response to said registering, containing the shared IP address and the first physical address;
  the second proxy client monitoring a status associated with the first proxy client; and
  if the first proxy client enters a predetermined state, then the second proxy client taking over for the first proxy client by registering as a client of the second proxy server, and causing the second proxy server to broadcast onto the network an unsolicited ARP reply containing the shared IP address and the second physical address.

7. A machine-readable medium having stored thereon data representing sequences of instructions, said sequences of instructions which, when executed by a processor of a secondary computer system on a network, cause said processor to:
  detect a change in status of a primary computer system on the network; and
  update an entry in an address translation table on a third computer system on the network by causing a first intermediate computer system that couples the secondary computer system to the network to transmit an unsolicited ARP reply to the third computer.

8. The machine-readable medium of claim 7, wherein prior to being updated the entry mapping a first logical address associated with the primary computer system to a first physical address, after being updated the entry mapping the first logical address to a second physical address.

9. The machine-readable medium of claim 8, wherein the primary computer system is coupled to the network through a second intermediate computer system which acts as an ARP proxy server for the primary computer system, and wherein the first physical address is associated with the second intermediate computer system and the second physical address is associated with the first intermediate computer system.

10. The machine-readable medium of claim 9, wherein the first and second physical addresses comprise Ethernet addresses.

11. The machine-readable medium of claim 8, wherein the unsolicited ARP reply indicates the first logical address maps to the second physical address.

12. The machine-readable medium of claim 11, wherein the first and second logical addresses comprise the same IP addresses.

13. A redundant computer system comprising:
  a processor;
  a storage device coupled to the processor, the storage device having stored thereon data representing sequences of instructions, the sequences of instructions, which when executed by a processor, cause said processor to:
  receive an indication of a change in status of a primary computer system; and
  update an entry in an address translation table on a third computer system on the network by causing a first intermediate computer system to transmit an unsolicited ARP reply to the third computer, wherein prior to being updated the entry mapping a first logical address associated with the primary computer system to a first physical address, after being updated the entry mapping the first logical address to a second physical address.

14. The redundant computer system of claim 13, wherein the primary computer system is coupled to the network through a second intermediate computer system which acts as an ARP proxy server for the primary computer system, and wherein the first physical address is associated with the second intermediate computer system and the second physical address is associated with the first intermediate computer system.

15. The redundant computer system of claim 14, wherein the first and second physical addresses comprise Ethernet addresses.

16. The redundant computer system of claim 13, wherein the unsolicited ARP reply indicates the first logical address maps to the second physical address.

17. The redundant computer system of claim 16, wherein the first and second logical addresses comprise the same IP addresses.

* * * * *